US012001893B1

(12) United States Patent
Khaitan et al.

(10) Patent No.: US 12,001,893 B1
(45) Date of Patent: Jun. 4, 2024

(54) DISTRIBUTED SYNCHRONIZATION SCHEME

(71) Applicant: Meta Platforms, Inc., Menlo Park, CA (US)

(72) Inventors: Harshit Khaitan, Fremont, CA (US); Liangzhen Lai, Fremont, CA (US); Xu Chen, San Jose, CA (US); Miguel Angel Guerrero, Palo Alto, CA (US); Simon James Hollis, Redmond, WA (US)

(73) Assignee: Meta Platforms, Inc., Menlo Park, CA (US)

(*) Notice: Subject to any disclaimer, the term of this patent is extended or adjusted under 35 U.S.C. 154(b) by 751 days.

(21) Appl. No.: 17/135,493

(22) Filed: Dec. 28, 2020

(51) Int. Cl.
G06F 9/52 (2006.01)
G06F 8/41 (2018.01)
G06N 20/00 (2019.01)

(52) U.S. Cl.
CPC .............. *G06F 9/52* (2013.01); *G06F 8/458* (2013.01); *G06F 9/522* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,710,265 | B1 | 7/2017 | Temam |
| 9,836,691 | B1 | 12/2017 | Narayanaswami |
| 10,175,980 | B2 | 1/2019 | Temam |
| 10,496,326 | B2 | 12/2019 | Temam |
| 10,534,607 | B2 | 1/2020 | Temam |

(Continued)

OTHER PUBLICATIONS

Li et al., "The Deep Learning Compiler: A Comprehensive Survey", Oct. 2020, IEEE Transactions on Parallel and Distributed Systems, vol. 32, No. 3, pp. 708-727. (Year: 2020).*

(Continued)

*Primary Examiner* — Qing Yuan Wu
(74) *Attorney, Agent, or Firm* — Greenberg Traurig, LLP

(57) ABSTRACT

A system including a machine-learning accelerator (MLA) hardware comprising computation-control units that each have a programmable dependency matrix; and a compiler computing module configured to generate, based on a machine-learning model, dependency instructions indicating dependencies between the computation-control units; wherein the computation-control units include at least: a first computation-control unit configured to generate, after completion of a first operation, a synchronization token representing the completion of the first operation, the synchronization token specifying a recipient identifier for an intended recipient computation-control unit of the synchronization token; a second computation-control unit configured to: configure the programmable dependency matrix of the second computation-control unit according to the dependency instructions to include dependency conditions for performing operations; receive the synchronization token based on the recipient identifier; update a dependency state to reflect the received synchronization token; and execute an operation in response to a determination that the dependency state satisfies the dependency condition.

20 Claims, 13 Drawing Sheets

(56) References Cited

U.S. PATENT DOCUMENTS

| | | |
|---|---|---|
| 10,802,956 B2 | 10/2020 | Temam |
| 11,449,338 B2 * | 9/2022 | Alexander .......... G06F 13/4027 |
| 2019/0205756 A1 | 7/2019 | Temam |
| 2020/0005128 A1 | 1/2020 | Temam |

OTHER PUBLICATIONS

Chen et al., "TVM: An automated end-to-end optimizing compiler for deep learning", Oct. 2018, 13th USENIX Symposium on Operating Systems Design and Implementation, pp. 578-594. (Year: 2018).*

Emer, et al., DNN Accelerator Architectures, ISCA Tutorial, 70 pages, 2019.

Dettmers, Deep Learning in a Nutshell: Core Concepts, 10 pages, 2020.

Jiao, et al., High-Performance Machine Learning, 2020 IEEE, pp. 136-138, Feb. 18, 2020.

* cited by examiner

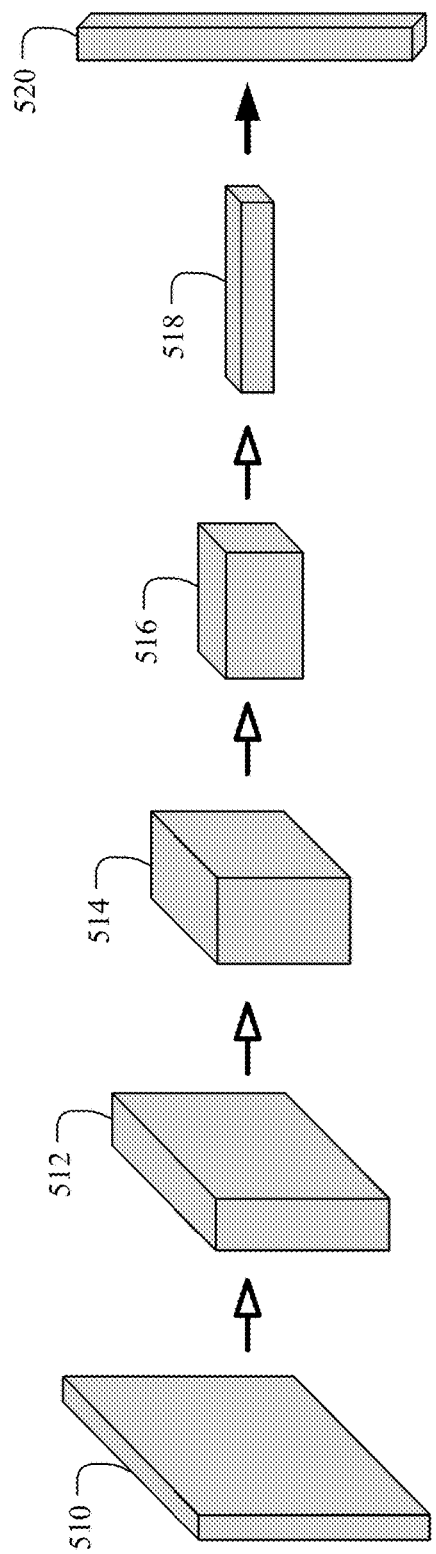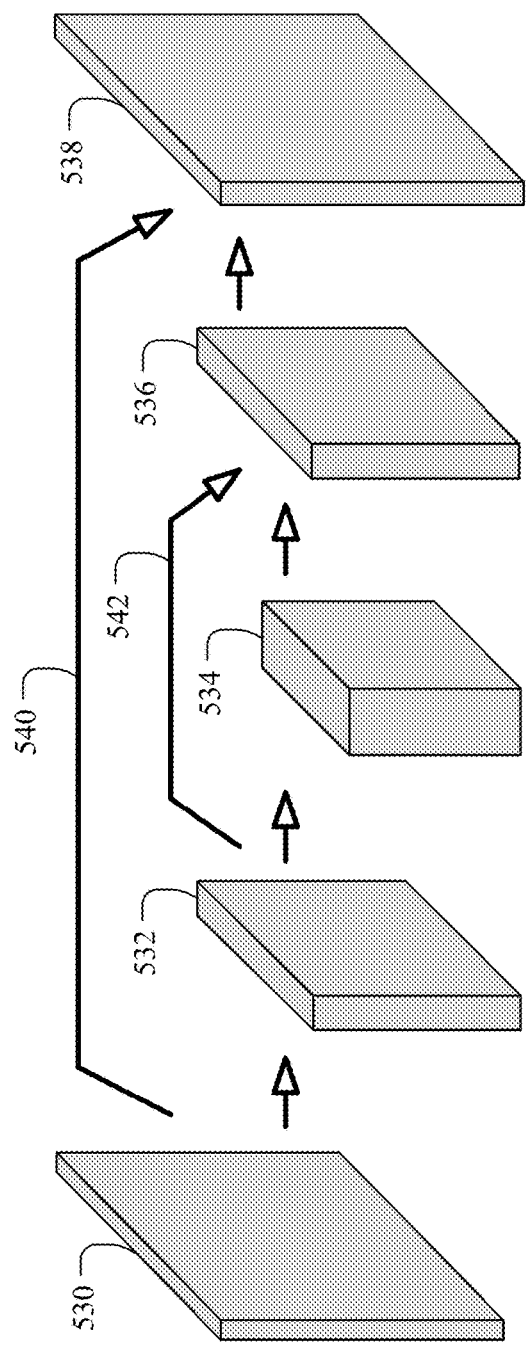
FIG. 5A
FIG. 5B

DISTRIBUTED SYNCHRONIZATION SCHEME

TECHNICAL FIELD

This disclosure generally relates to a distributed synchronization scheme for machine learning accelerators.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Therefore, existing ML accelerators focus on using high compute parallelism along with an optimized data orchestration throughout the memory hierarchy to speed up the processing of convolutional layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

Innovative aspects of the subject matter described in this specification may be embodied in a system that includes a machine-learning accelerator (MLA) hardware comprising computation-control units that each have a programmable dependency matrix; and a compiler computing module configured to generate, based on a machine-learning model, dependency instructions indicating dependencies between the computation-control units; wherein the computation-control units include at least: a first computation-control unit configured to generate, after completion of a first operation, a synchronization token representing the completion of the first operation, the synchronization token specifying a recipient identifier for an intended recipient computation-control unit of the synchronization token; a second computation-control unit configured to: configure the programmable dependency matrix of the second computation-control unit according to the dependency instructions to include dependency conditions for performing operations; receive the synchronization token based on the recipient identifier; update a dependency state to reflect the received synchronization token; and execute an operation in response to a determination that the dependency state satisfies the dependency condition.

Other embodiments of these aspects include corresponding methods, apparatus, and computer programs, configured to perform the actions of the methods, encoded on computer storage devices.

These and other embodiments may each optionally include one or more of the following features. For instance, the first computation-control unit and the second computation-control unit each generates the respective programmable dependency matrix based on the dependencies between the computation-control units. The second computation-control unit updates the dependency state by incrementing a count of the respective programmable dependency matrix that corresponds to the received synchronization token. The second computation-control unit executes the operation based on the count. The synchronization token specifies a recipient identifier for an intended recipient based on a channel identifier (ID) of a channel that the synchronization token is transmitted on between the first computation-control unit and the second computation-control unit. The synchronization token specifies a receipt identifier for an intended receipt based on a client identifier (ID) of the second computation-control unit. The second computation-control unit, after execution of the operation, generates an additional synchronization token representing the completion of the operation, the additional synchronization token specifying a recipient identifier for an intended recipient computation-control unit of the additional synchronization token. The computation-control units (1) operate asynchronously without a deterministic timing relationship with one another, and (2) execute operations according to their respective programmable dependency matrices.

The details of one or more embodiments of the subject matter described in this specification are set forth in the accompanying drawings and the description below. Other potential features, aspects, and advantages of the subject matter will become apparent from the description, the drawings, and the claims.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

BRIEF DESCRIPTION OF THE DRAWINGS

FIG. 5A illustrates an example CNN for a classification-type network.

FIG. 5B illustrates an example CNN for a UNet-type network.

DESCRIPTION OF EXAMPLE EMBODIMENTS

The present disclosure relates to an architecture for a synchronization scheme for use with a machine-learning (ML) accelerator (MLA) used in a machine learning (ML) process. Specifically, a convolution operation used in the ML process can be processed in a distributed matter, with multiple synchronization dependencies between operations needed to complete the operation. The instant synchronization scheme can include "producer-consumer" relationships inside producing and consuming computing threads without the need for a centralized control unit to facilitate such synchronization. The instant synchronization scheme uses a token exchange mechanism to track producer-consumer relationships. Threads can be programmed to block execution until appropriate tokens are received. Additionally, threads can be programmed to produce tokens upon completion of an operation, and send such to destination threads. The token producer can produce tokens that indicate the channel it produces a token on, as well as a list of destination threads that will consume the token. The token consumer can indicate the set of token channels it is dependent upon. The synchronization scheme can be implemented as: tokens are broadcast by token producers to targeted token consumers; each token consumer listens for appropriate tokens, and when an appropriate token is received, it increments a corresponding token counter; when the token dependencies of the counter are satisfied, the consumer token thread consumes the token(s) when ready and decrements the corresponding token counter(s).

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
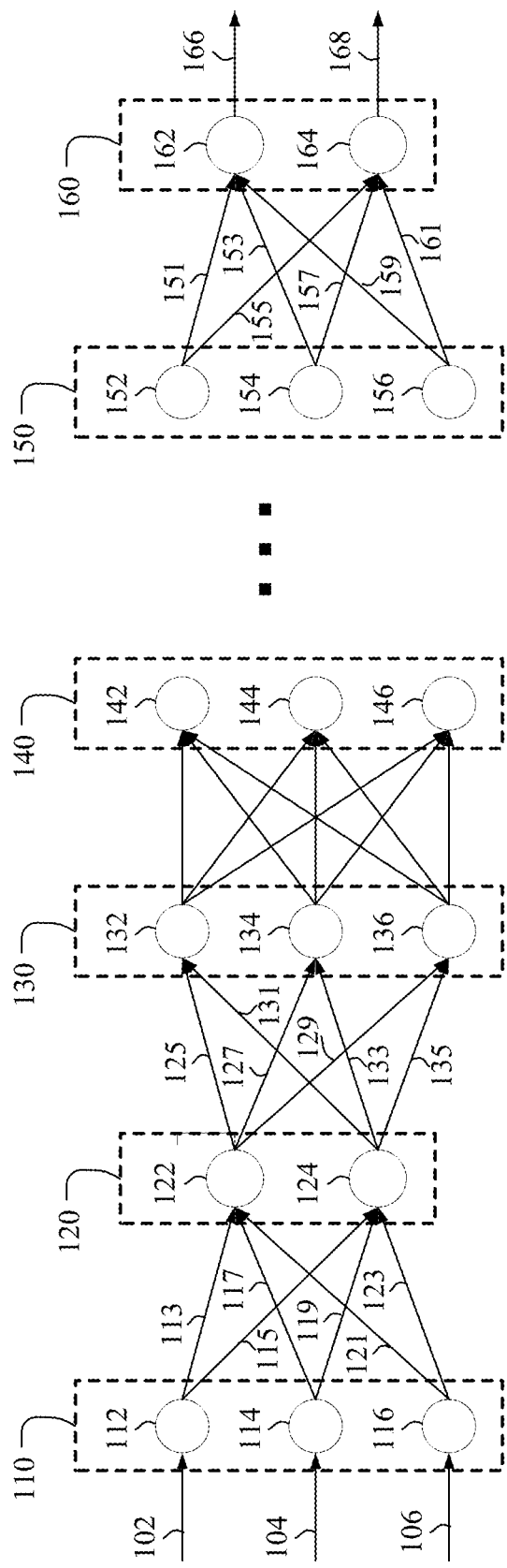
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 110 that receives a set of inputs or a vector input to an output layer 160 that includes a set of outputs or a vector output. Each layer may include any given number of nodes, which are herein illustratively shown as circles within each layer. For example, input layer 110 includes three nodes, shown as nodes 112 114, and 116, and output layer 160 includes two nodes, shown as 162 and 164. The example neural network illustrated in FIG. 1 includes at least four hidden layers but may include additional hidden layers not shown in FIG. 1. In the illustrated example, the first hidden layer 120 includes two nodes, shown as nodes 122 and 124, while hidden layers 130, 140, and 150 each include three nodes, shown as nodes 132, 134, and 136, nodes 142, 144, and 146, and nodes 152, 154, and 156, respectively. Generally, the deeper the MLP (e.g., the greater the number of hidden layers in the MLP), the greater its capacity to learn. The input layer 110 receives a vector input, illustratively shown as a three-dimensional vector consisting of inputs 102, 104 and 106, and may apply the received vector input to the first hidden layer 120 in the sequence of hidden layers. The output layer 160 receives the output from the last hidden layer in the multilayer model, e.g., 150, processes its inputs, and produces a vector output result, illustratively shown as a two-dimensional vector consisting of outputs 166 and 168.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 110 may receive only one input and may be passive, meaning that each node may simply relay the value of its single input to its output(s) thus providing a copy of the input to the output(s).

In the example neural network illustrated in FIG. 1, the outputs of nodes 112, 114, and 116 of input layer 110 feed forward as inputs to hidden layer 120, which includes nodes 122 and 124. The outputs of nodes 122 and 124, in turn, feed forward as inputs to hidden layer 130, which includes nodes 132, 134, and 136, the outputs of nodes 132, 134, and 136 feed forward as inputs to hidden layer 140, which includes nodes 142, 144, and 146, and so on. Finally, the outputs of nodes 152, 154, and 156 of the final hidden layer 150 feed forward as inputs to output layer 160, which includes nodes 162 and 164. Interconnections, or links, between neurons, shown in FIG. 1 as arrows between various nodes, may have respective weights associated with them. For example, the interconnection between node 112 of input layer 110 and node 122 of hidden layer 120 may be associated with a weight 113. In addition, the interconnection between node 112 of input layer 110 and node 124 of hidden layer 120 may be associated with a weight 115, the interconnection between node 114 of input layer 110 and node 122 of hidden layer 120 may be associated with a weight 117, the interconnection between node 114 of input layer 110 and node 124 of hidden layer 120 may be associated with a weight 119, the interconnection between node 116 of input layer 110 and node 122 of hidden layer 120 may be associated with a weight 121, and the interconnection between node 116 of input layer 110 and node 124 of hidden layer 120 may be associated with a weight 123. Similarly, the interconnections between the nodes of hidden layers 120 and 130 may be associated with weights 125, 127, 129, 131, 133, and 135, respectively, and the interconnections between the nodes of hidden layers 150 and output layer 160 may be associated with weights 151, 153, 155, 157, 159, and 161, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
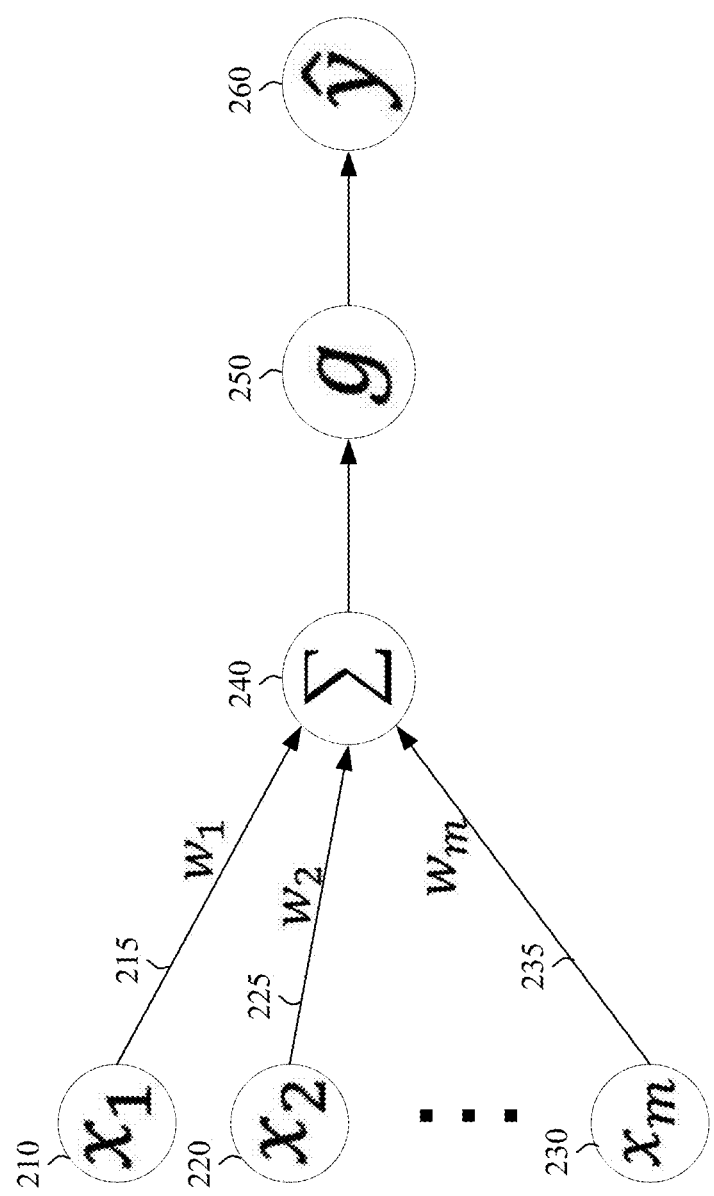
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector $\hat{y}$ for a particular neural network node given inputs $x_1$ (210), $x_2$ (220), and $x_3$ (230), respective interconnection weights $w_1$ (215), $w_2$ (225), and $w_3$ (235), and a non-linear activation function g (250). In the illustrated example, the output vector $\hat{y}$ may be determined may applying the activation function g (250) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For examples, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3:
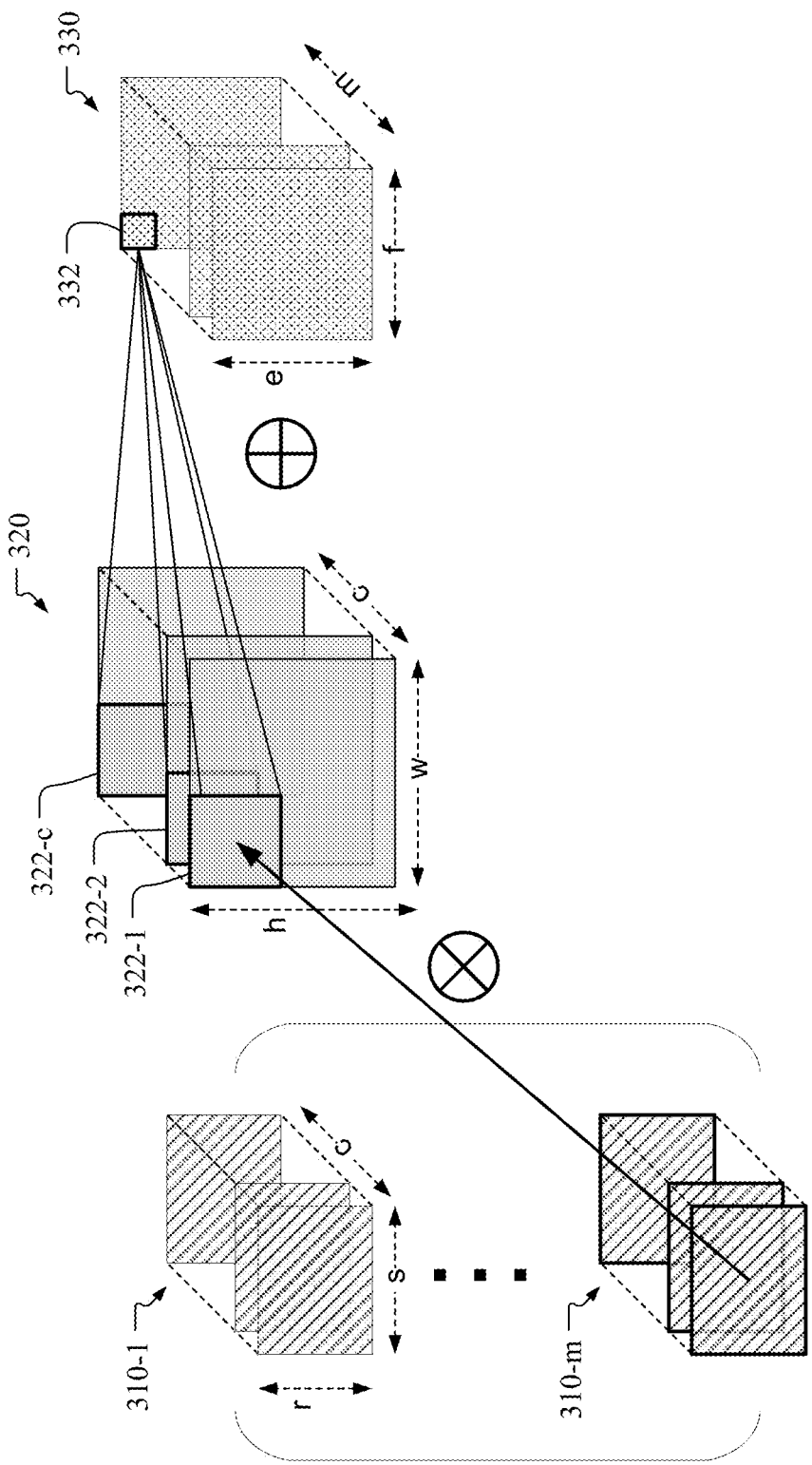
FIG. 3 illustrates selected elements of an example convolutional layer in a convolutional neural network (CNN).

FIG. 3 illustrates selected elements of an example convolutional layer in a convolutional neural network. In the illustrated example, a three-dimensional (3D) output feature map 330 is generated by performing a series of two-dimensional (2D) convolution operations over a 3D input feature map 320 using a collection of 2D convolution filters 310. More specifically, the input feature map 320 has dimensions h (height)×w (width)×c (where c represents the number of input channels) and the output feature map 330 has dimensions e×f×m (where m represents the number of output channels). In this example, multiple filters 310 are to be applied to the input feature map to generate each element, of each channel, of the output feature map. More specifically, a respective different filter 310 is applied to produce the elements of the output feature map for each given output channel. Therefore, the number of filters 310 (i.e., m) matches the number of output channels (m).

As shown in FIG. 3, each 3D filter 310 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 320. More specifically, each 2D kernel of filter 310-$m$ is applied in a convolution operation over the elements in a respective channel of input feature map 320. For example, a first 2D kernel of filter 310-$m$ provides the weights that are multiplied by respective values of the elements in an r×s sized portion 322-1 of the elements of a first channel of input feature map 320, a second 2D kernel of filter 310-$m$ provides the weights that are multiplied by respective values of the elements in an r×s sized portion 322-2 of the elements of a second channel of input feature map 320, and so on, such that a final 2D kernel of filter 310-$m$ provides the weights that are multiplied by respective values of the elements in an r×s sized portion 322-$c$ of the elements of the last channel of input feature map 320. The results of these multiplication operations are then combined to generate a single element 332 of a single channel of output feature map 330, as shown in FIG. 3. This process is repeated as the 2D kernels of filter 310-$m$ are applied to other portions of input feature map 320 to produce the remaining elements of output feature map 330 in the same output channel as element 332, and as the 2D kernels of respective other ones of the filters 310 are applied to input feature map 320 to produce the elements of output feature map 330 in each of the remaining output channels.

Figure 4:
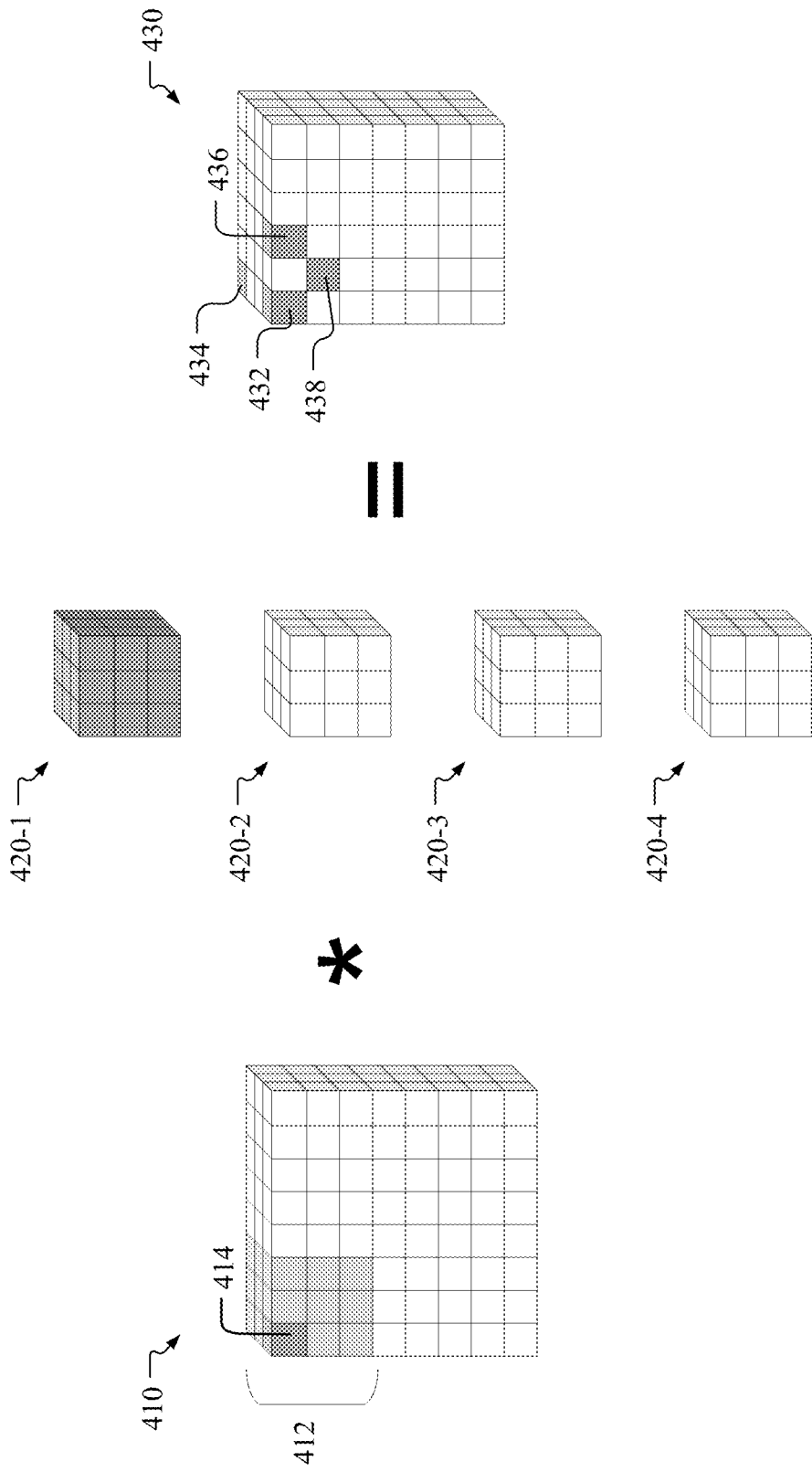
FIG. 4 illustrates an example multi-level convolution operation.

FIG. 4 illustrates an example multi-channel convolution operation, in accordance with particular embodiments. In this example, a multi-channel (3D) output feature map 430 is generated by the application of multiple 3D filters 420 to successive portions of a multi-channel (3D) input feature map 410. In this example, the dimensions of input feature map 430 are X×Y×Zin, where Zin represents the number of input channels, and the dimensions of output feature map 430 are Xout×Yout×Zout, where Zout represents the number of output channels. Each 3D filter 420 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 430 is computed as follows:

$$[x][y][zout] += activations[x+kx][y+ky][zin] * weights[kx][ky][zin][zout]$$

In the illustrated example, there is one 3D filter 420 for each channel (zout) in Zout. More specifically, the illustrated multi-channel convolution uses four 3D filters 420 to generate elements for each x/y position in each of four output channels, respectively, while sweeping the appropriate 2D kernels across and down the elements of input feature map 410 in each of the input channels. For example, the value of element 432 of output feature map 430 is determined by applying highlighted 3D filter 420-1 to the highlighted portion 412 of input feature map 410, i.e., 36 activations including 9 activations in respective x/y positions in each of 4 input channels zin. Similarly, the value of element 434 of output feature map 430 is determined by applying 3D filter 420-4 to the highlighted portion 412 of input feature map 410.

Traversing input feature map 410 in the x dimension involves sweeping the highlighted portion 412 across the input feature map such that element 414 moves one position to the right to identify a next set of activations for each successive iteration in the x dimension. For example, the value of element 436 of output feature map 430 is determined by applying 3D filter 420-1 to the highlighted portion 412 of input feature map 410 after the highlighted portion has been moved from the initial position in which it is shown in FIG. 4 to a location one position to the right. Traversing input feature map 410 in the y dimension involves sweeping the highlighted portion 412 across the input feature map such that element 414 moves one position down to identify a next set of activations for each successive iteration in the y dimension. For example, the value of element 438 of output feature map 430 is determined by applying 3D filter 420-1 to the highlighted portion 412 of input feature map 410 after the highlighted portion has been moved from the initial position in which it is shown in FIG. 4 to a location one position down and one position to the right.

Performing the multi-channel convolution illustrated in FIG. 4 involves performing a series of 2D convolutions, as follows:

```
for zout in Zout
    for x in Xout
        for y in Yout
            for kx in KernelX
                for ky in KernelY
                    for zin in Zin
                        output [x] [y] [zout] +=
                            activations [x + kx][y + ky] [zin] *weights [kx] [ky] [zin] [zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

for the activation addresses:

```
for x in Xout
    for y in Yout
        for kx in KernelX
            for ky in KernelY
                for zin in Zin
                    activations [x + kx][y + ky] [zin],
``` for the weight addresses:

```
for zout in Zout
    for kx in KernelX
        for ky in Kernel Y
            for zin in Zin
                weights [kx] [ky] [zin] [zout],
``` and for the output address:

```
for zout in Zout
    for x in Xout
        for y in Yout
            for zin in Zin
                outputs[x][y][zout].
```

FIG. 5A illustrates an example convolutional neural network in which an output feature map 520 is generated based on an input feature map 510 in a classification-type neural network. This type of neural network may typically involve a small or medium resolution input, a single vector output, and a relatively large number of output channels. In the illustrated example, intermediate feature maps of different sizes and shapes, shown as feature maps 512, 514, 516 and 518, are generated by performing successive convolution operations on each such intermediate feature map, in turn, and the output feature map 520 is generated by a fully connected (FC) layer operating on the final intermediate feature map 518. As shown in FIG. 5A, it may be typical for the overall size, and corresponding memory requirements, to be reduced for each successive intermediate feature map in a classification-type neural network.

FIG. 5B illustrates an example CNN in which an output feature map 538 is generated based on an input feature map 530 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 540 and 542 in FIG. 5B. In the illustrated example, intermediate feature maps of different sizes and shapes, shown as feature maps 532, 534, and 536, are generated using a series of convolution operations prior to the generation of the output feature map 538. In this example, intermediate feature map 532 is generated based on input feature map 530, intermediate feature map 534 is generated based on intermediate feature map 532, intermediate feature map 536 is generated based on both intermediate feature map 534 and on intermediate feature map 532, and output feature map 538 is generated based on both intermediate feature map 536 and input feature map 530. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processors within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

The ML accelerators described herein employ a multi-level control architecture designed to optimally exploit parallelism provided by tensor processors in the ML accelerator. These machine learning accelerators may include one or more tensor processor clusters, each of which may include multiple tensor processors. Each tensor processor may be a single-instruction-multiple-data (SIMD) machine that includes a compute array capable of performing vector operations to implement data parallelism or model parallelism at the tensor processor or tensor processor cluster level. Each tensor processor cluster may include a shared controller that controls and synchronizes the operations of the tensor processors within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
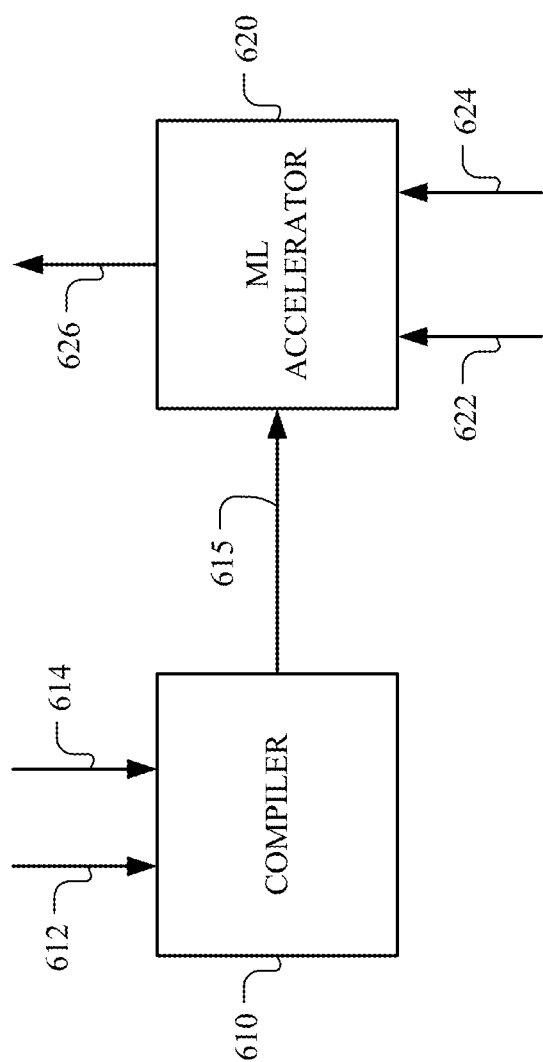
FIG. 6 illustrates selected elements of an example system including a compiler and an ML accelerator.

FIG. 6 illustrates selected elements of an example system including a compiler 610 and an ML accelerator 620. In the illustrated example, compiler 610 generates machine language instructions, shown as tensor instructions 615, based on inputs including programming language instructions 612 and configuration information 614 indicating the configuration of a neural network that is to perform the tensor instructions 615. In this example system, ML accelerator 620 receives the tensor instructions 615 and generates, for input features 622 and applicable weights 624, output features 626. For example, compiler 610 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear (NLU) instructions, and direct memory access (DMA) instructions.

In particular embodiments, the compiler 610 may analyze a workload to be performed by the neural network and determine respective coarse-grained tensor instructions to be sent to each tensor processor cluster of ML accelerator 620 using a SIMD and/or single-program-multiple-data (SPMD) approach to distribute the workload. The compiler 610 may distribute the workload based on the architecture of the neural network, the number of tensor processor clusters, the number and processing capacity of the tensor processors in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processors, reduce the amount of data movement required between and within tensor processor clusters, and optimize resource utilization in ML accelerator 620.

Figure 7A:
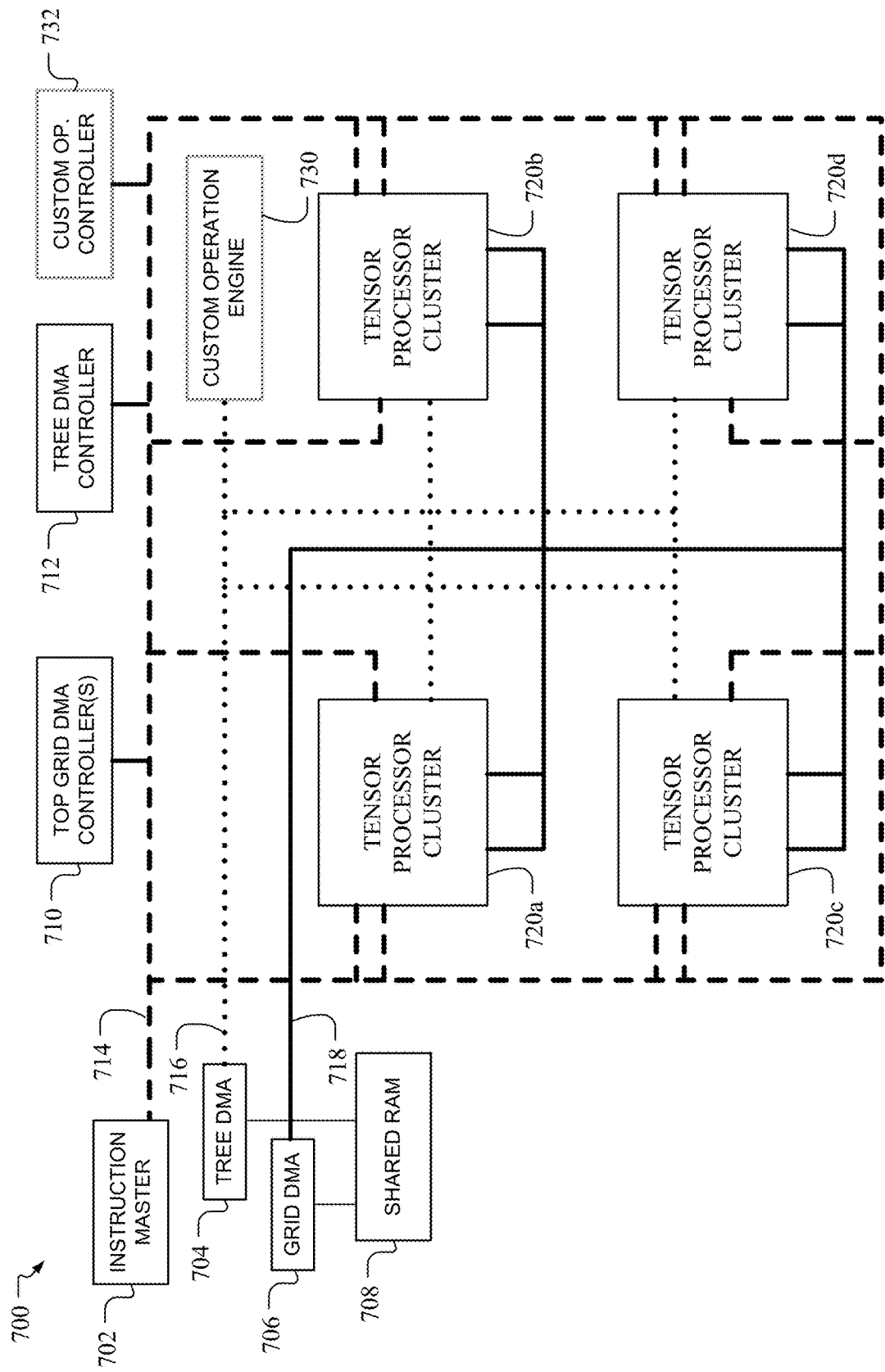
FIG. 7A illustrates selected elements of an example ML accelerator including multiple tensor processor clusters.
Figure 7B:
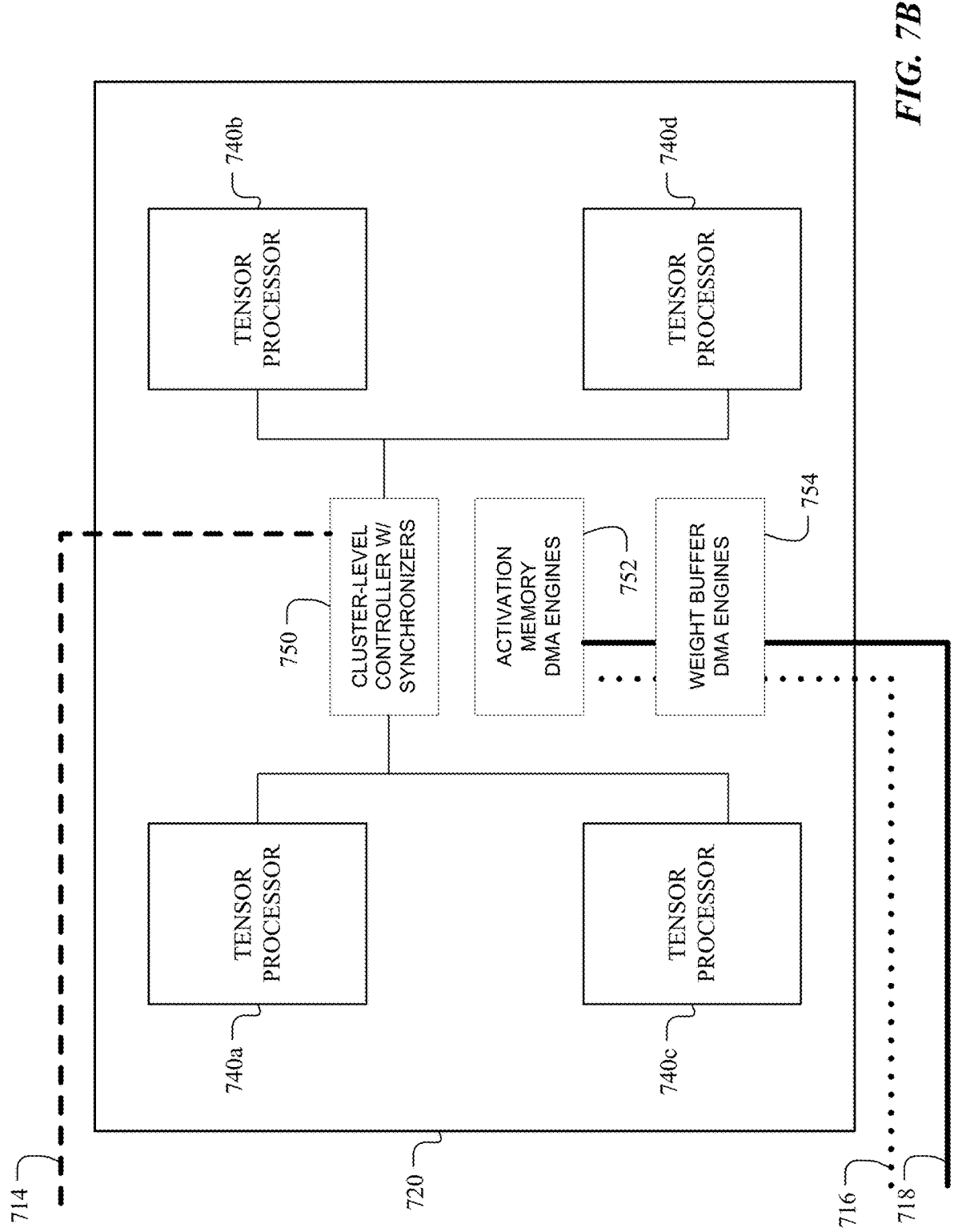
FIG. 7B illustrates selected elements of an example tensor processor cluster.
Figure 7C:
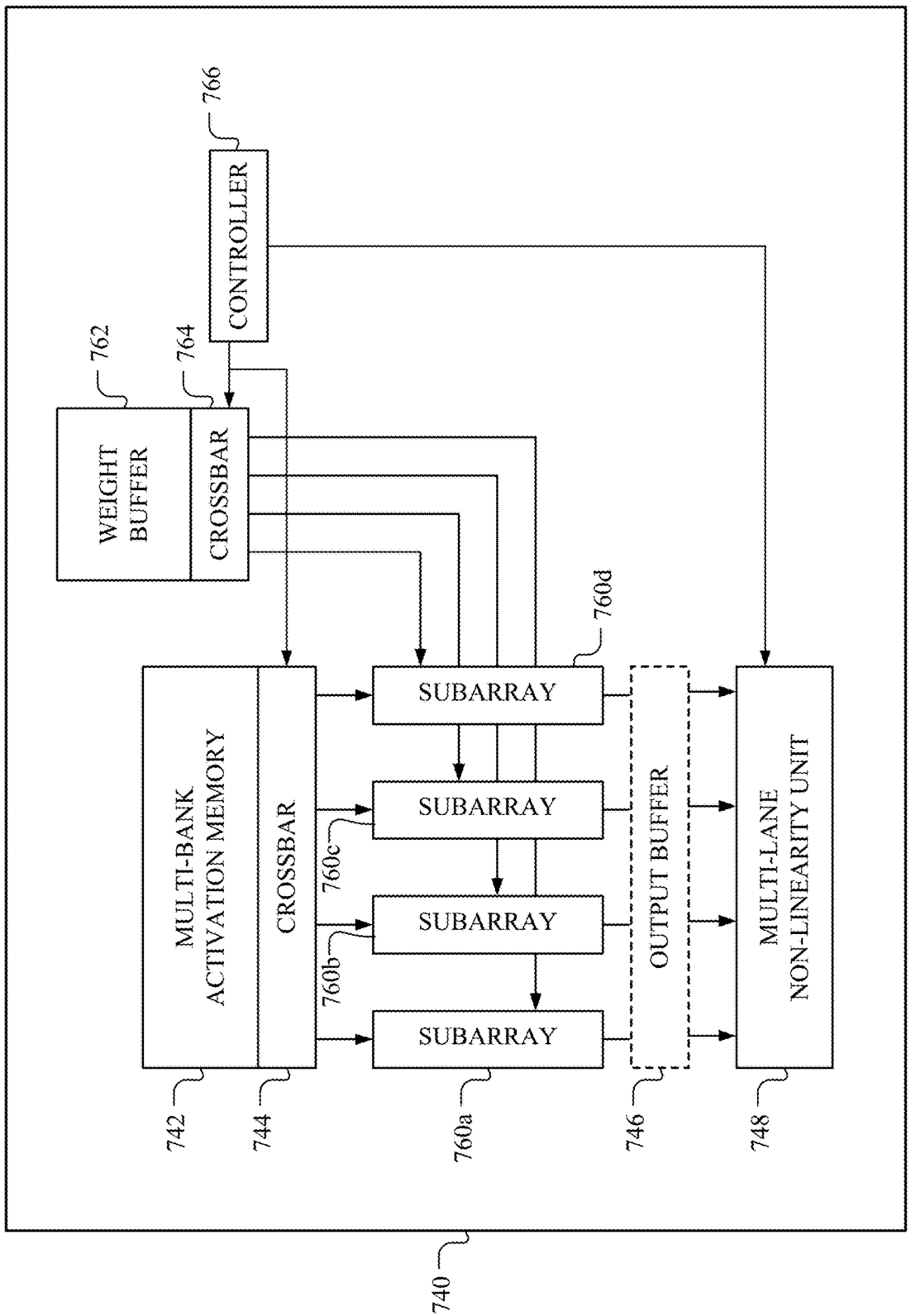
FIG. 7C illustrates selected elements of an example tensor processor.

FIGS. 7A through 7C illustrate selected elements of an example ML accelerator, such as an ML accelerator similar to ML accelerator 620 illustrated in FIG. 6, at different levels of the multi-level accelerator architecture. For example, FIG. 7A illustrates that an example ML accelerator 700 may include four tensor processor clusters 720 and may include, or be communicably coupled to, one or more top grid DMA controllers 710, a tree DMA controller 712, and/or an optional custom operation engine 730 and a corresponding optional custom operation controller 732. ML accelerator 700 may include, or be communicably coupled to, an instruction master 702, which may be communicably coupled to each of the four tensor processor clusters 720, the top grid DMA controllers 710, and the tree DMA controller 712 over an instruction bus 714. ML accelerator 700 may also include a tree DMA 704 and a grid DMA 706, each of which is communicably coupled to a shared RAM 708. Tree DMA 704 may be communicably coupled to each of the four tensor processor clusters 720 and the optional custom operation engine 730 over tree DMA bus 716. Grid DMA 706 may be communicably coupled to each of the four tensor processor clusters 720 over grid DMA bus 718. In at least some embodiments, ML accelerator 700 may also include a synchronization bus communicably coupled to the four tensor processor clusters 720, the top grid DMA controllers 710, the tree DMA controller 712, the optional custom operation engine 730 and corresponding optional custom operation controller 732, the instruction master 702, the tree DMA 704, the grid DMA 706, and/or the shared RAM 708, or any suitable subset thereof (not shown in FIG. 7A).

To support multiple tensor processor clusters processing input features in parallel, tree DMA controller 712 may distribute neural network weights (e.g., in packets) to tensor processor clusters 720 via tree DMA bus 716. The network topology in which the tree DMA controller 712 is communicatively coupled to each of the tensor processor clusters 720 may allow each tensor processor within a tensor processor cluster 720 to be communicatively coupled to the tree DMA controller 712 via a respective sub-branch of the tree DMA bus 716. Similarly, one or more top grid DMA controllers 710 may distribute activations to tensor processor clusters 720 via grid DMA bus 718. The network topology in which the grid DMA controller 710 is communicatively coupled to each of the tensor processor clusters 720 may allow each tensor processor within a tensor processor cluster 720 to be communicatively coupled to the grid DMA controller 710 via a respective sub-branch of the grid DMA bus 718. By structuring the tree DMA bus 716 and the grid DMA bus 718 according to a tree network topology (e.g., rather than a star or ring topology), the corresponding DMA controllers 712 and 710 may distribute neural network weights and activations to each tensor processor cluster 720 directly, thereby minimizing latency and overall power consumption. As such, the machine learning accelerator 700 may be suitable for AR/VR applications or other applications that require feature processing with minimal latency within a finite power budget.

FIG. 7B illustrates selected elements of an example tensor processor cluster 720, such as one of the four tensor processor clusters 720 of ML accelerator 700 illustrated in FIG. 7A. In this example, tensor processor cluster 720 includes four tensor processors 740, a shared cluster-level controller 750, one or more activation memory DMA engines 752, and one or more weight buffer DMA engines 754. An example tensor processor 740 is illustrated in FIG. 7C and described below. The shared cluster-level controller 750 may interpret each coarse-grained tensor instruction received from a compiler, such as compiler 610 illustrated in FIG. 6, and translate it into a series of fine-grained tensor instructions that are multicast to the tensor processors in the tensor processor cluster tasked with performing the common series of operations. Each of these fine-grained tensor instructions may, for example, represent a vector read operation, a vector write operation, a vector addition operation, or a vector multiplication operation to be performed by hardware compute arrays within each tensor processor or may represent a non-linear instruction to be applied to an intermediate output of the hardware compute arrays to produce an element of an output feature set. The shared cluster-level controller 750 may include synchronizers that synchronize the operations of the tensor processors within the cluster so that they perform the common series of operations in parallel and in lockstep. The shared cluster-level controller 750 may ensure that the appropriate subsets of the input feature set and the weights to be applied for that operation have been loaded into the local memories for each tensor processor. This may include generating an address pattern for the weights, generating an address pattern for the input activations, and generating an address pattern for the outputs of the common series of operations.

The cluster-level controller 750 receives tensor instructions, e.g., coarse-grained tensor instructions, over instruction bus 714. Each coarse-grained tensor instruction sent to a tensor processor cluster 620 may encode information usable by the cluster to perform a multi-cycle operation corresponding to a part of a single neural network layer. In one example, using a SPMD approach, the compiler 610 may distribute the workload such that different tasks are assigned to different tensor processor clusters 620 with some or all of the tensor processor clusters 620 operating on the same input feature set. Using this approach, the tensor processor clusters 620 may operate in parallel but may typically not operate in lockstep with each other. In another example, using a SIMD approach, the compiler 610 may distribute the workload such that the same tasks are assigned to multiple tensor processor clusters 620 and such that each of those multiple tensor processor clusters 620 operates on different data, such as on a different subset of an input feature set for the neural network. Using this approach, the tensor processor clusters 620 may operate in parallel and may typically, but not necessarily, operate in lockstep with each other. By contrast, within a tensor processor cluster 620, the operations of the tensor processors 740 of the cluster may always be performed in parallel and in lockstep.

In particular embodiments, the activation memory DMA engines 752 and weight buffer DMA engines 754 are communicably coupled to a grid DMA and a tree DMA, such as those illustrated in FIG. 7A, over grid DMA bus 718 and tree DMA bus 716, respectively, to provide the appropriate weights and input features to each tensor processor 740 in each cycle.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processors described in this application addresses this problem using flexible hardware resources and flexible computation-to-hardware mapping. For example, FIG. 7C illustrates selected elements of an example tensor processor 740, such as one of the four tensor processors 740 of tensor processor cluster 720 illustrated in FIG. 7B. In particular embodiments, tensor processor 740 is implemented with a flexible architecture in which computation components are organized such that the tensor processor can support a variety of convolutional layer shapes with high resource utilization and high reuse of locally available data. The tensor processor 740 may be a single-instruction-multiple-data (SIMD) machine that includes a compute array capable of performing vector operations that collectively implement higher-level tensor instructions using data parallelism or model parallelism in a neural network. In this example, tensor processor 740 includes a multi-bank activation memory 742, a first crossbar 744, four compute subarrays 760, an optional output buffer 746, a multi-lane non-linearity unit 748, a weight buffer 762, e.g., a register file storing weights, a second crossbar 764, and a local controller 766. In particular embodiments, tensor processor 740 may, during operation, be dynamically configured to perform convolution operations of different sizes and shapes by controlling the size and shape of the input feature map data and weights supplied to each of the subarrays 760 and MAC computation units thereof using the flexible crossbars 744 and 764 and by controlling the reduction and/or combination of the outputs of the each of the subarrays 760 and MAC computation units thereof to generate an output feature map of a desired size and shape. In particular embodiments, tensor processor 740 may also be configured to perform group convolution operations in which not all output elements depend on the same input elements or weights.

In the illustrated example, multi-bank activation memory 742 includes local memory elements that store the input feature map elements to be provided to various ones of the subarrays 760. The first crossbar 744 is a first flexible many-to-many crossbar that reads input feature map elements (e.g., pixel values) from multi-bank activation memory 742 and provides them to the appropriate subarrays 760 in each cycle. In the illustrated example, weight buffer 762, which may be implemented as a register file, includes local memory elements that store the filter weights to be provided to various ones of the subarrays 760. The second crossbar 764 is another flexible crossbar that loads filter weights from weight buffer 762 and provides them to the appropriate subarrays 760 in each cycle.

In particular embodiments, each of the four compute subarrays 760 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 766 within tensor processor 740 may, e.g., in conjunction with a shared cluster-level controller, such as shared cluster-level controller 750 illustrated in FIG. 7B, control the operation of the crossbars 744 and 764 and the flexible reduction module or multi-lane non-linearity unit 748, in accordance with the coarse-grained tensor instructions received from compiler 610 illustrated in FIG. 6 and/or fine-grained instructions received from the shared cluster-level controller 750.

In particular embodiments, the optional output buffer 746 stores intermediate outputs from one or more subarrays 760 such that partial results may be accumulated prior to passing them through a reduction module, thus reducing the scope and/or complexity of the reduction operation. In particular embodiment, the multi-lane non-linearity unit 748 is a flexible reduction module configurable to take an intermediate computation output from the subarrays 760 and perform a reduction (i.e., addition) of subarray outputs to produce an output for tensor processor 740 as a whole, where appropriate.

Figure 8:
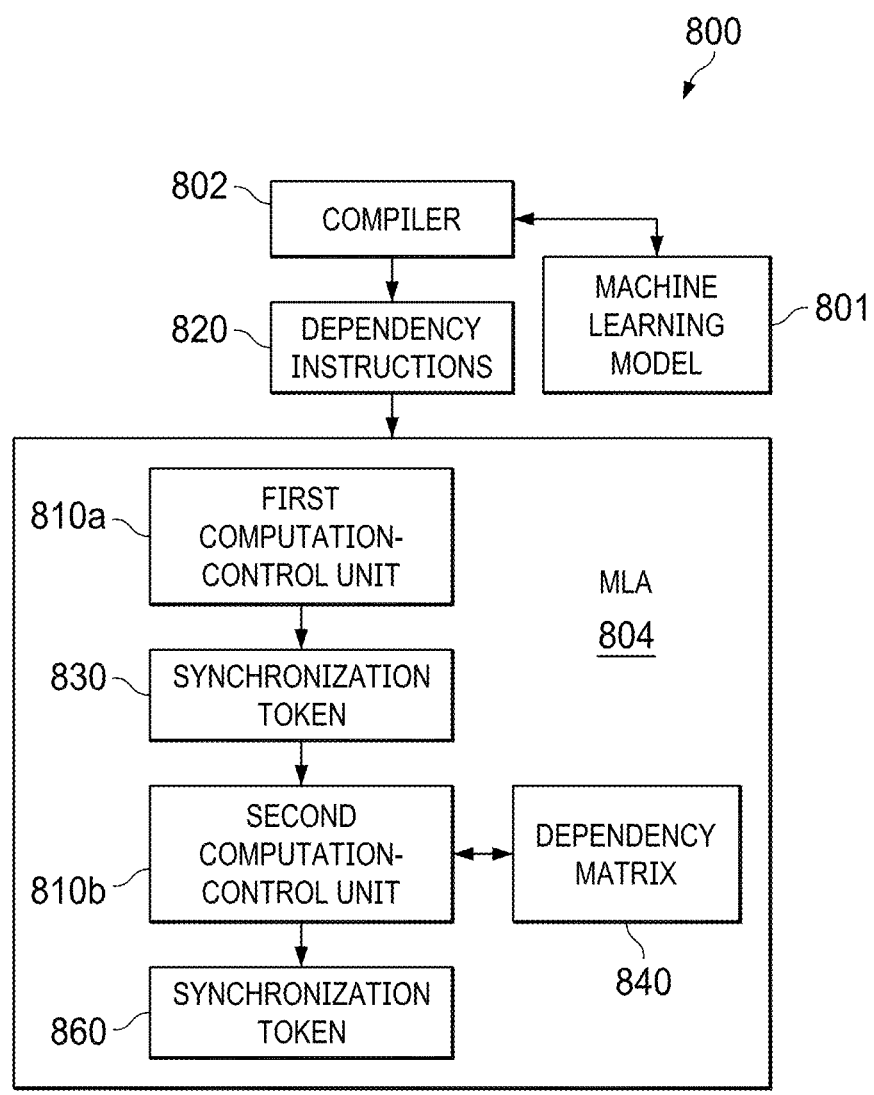
FIGS. 8-10 illustrate respective example computing architectures for a synchronization scheme for use with a machine-learning (ML) accelerator (MLA) used in a machine learning (ML) process.

FIG. 8 illustrates a computing environment 800. The computing environment 800 can include a compiler 802 and a ML accelerator (MLA) 804. The compiler 802 can be in communication with the MLA 804. In some examples, the compiler 802 is substantially the same as the compiler 610 of FIG. 6. In some examples, the MLA 804 is substantially the same as the ML accelerator 620 of FIG. 6. The MLA 804 can include a first computation-control unit (CCU) 810a and a second CCU 810b (collectively referred to as CCUs 810); however, the MLA 804 can include any number of CCUs 810 depending on the application desired. The CCUs 810 can corresponding to any processing block of FIG. 7—e.g., any processing block of the ML accelerator 620. For example, the CCUs 810 can correspond to any of the compute subarrays 760.

In short, the environment 800 facilitates a distributed synchronization scheme to manage "producer-consumer" relationships without the need for intervention from a centralized control unit. Specifically, the distributed synchronization scheme can use a token exchange mechanism to implement tracking of relationships between the CCUs 810 (e.g., producer-consumer relationships). The CCUs 810 (or programming threads) can be programed to block execution until one or more tokens are received (e.g., by a consumer CCU, or consumer thread). Upon completion of an operation, the CCUs 810 can be programed to produce one or more tokens (e.g., by a producer CCU, or producer thread) and transmit the same to destination CCUs. As a result, a single CCU 810 can be mapped to a single CCU 810 (e.g., single producer to single consumer); a single CCU 810 can be mapped to multiple CCUs 810 (e.g., single producer to multiple consumers); multiple CCUs 810 can be mapped to a single CCU 810 (e.g., multiple producers to a single consumer); and multiple CCUs 810 can be mapped to multiple CCUs 810 (e.g., multiple producers to multiple consumers).

The tokens are distributed by the CCUs 810 via a programmable selective multi-casts on channels. The CCU 810 that produces the token can indicate both the channel it produces the token on, as well as a list of destination CCUs 810 that can consume such token. The CCU 810 that consumes the token can indicate the set of token channels it will wait for a token on before progressing (performing further operations). Furthermore, the CCUs 810 that consume the tokens can count the number of tokens that have arrived on each channel (e.g., since system reset), increasing the count by one each time a token arrives and decreasing the count by one each time the CCU 810 performs an operation (thread execution is allowed to progress) by the corresponding token(s) arriving. This allows CCUs 810 that produce tokens to continue execution, even if a CCU 810 that consumes the associated token has not yet progressed to a point at which it would consume the related token. Furthermore, the distributed synchronization among the CCUs 810 can allow i) multiple synchronizations to progress concurrently, ii) scalability of CCUs 810 (threads), iii) tracking of repetitive synchronizations, and iv) non-deterministic ordering of the CCUs 810.

The compiler 802 can be configured to generate, based on a machine-learning model 801, dependency instructions 820 indicating dependencies between the CCUs 810. Specifically, the compiler 802 can generate machine-learning instructions that indicate the dependency instructions 820. The dependency instructions 820 can indicate dependencies between the CCUs 810, and in particular, dependencies between operations performed by each of the CCUs 810. For example, an operation (e.g., convolution operation) that is performed by the second CCU 810b can be dependent upon completion of an operation (e.g., convolution operation) by the first CCU 810a. Thus, the dependency instructions 820 can indicate that an operation that is performed by the second CCU 810b can be dependent upon completion of an operation that is performed by the first CCU 810a.

The MLA 804 can be configured to perform machine-learning operations according to the machine-learning instructions, and specifically, the dependency instructions 820. In some examples, the machine-learning instructions can include an agent identification (ID) that identifies a control block of the MLA 804, such as a non-linear unit (e.g., non-linear unit 748). In some examples, the machine-learning instructions can include computation instructions such as parameters for NLU operations. In some examples, the machine-learning instructions can include CCU producer synchronization fields that can indicate tokens that will be transmitted upon operation completion and associated destinations/channels. In some examples, the machine-learning instructions can include CCU consumer synchronization files that can indicate dependencies of which tokens from which CCU producers on which channels.

The first computation control unit 810a can be configured to complete a first operation. For example, the operation can include any operation associated with the ML accelerator 620 or 804. For example, the operation can include storing, accessing, or moving data associated with convolution operations mentioned herein, such as weights and activations. The first computation control unit 810a can further be configured, after completion of the first operation, to generate a synchronization token 830 representing completion of the first operation. The synchronization token 830 can be associated with a token identifier (token ID) that identifies the synchronization token 830.

In some examples, the synchronization token 830 can specify an intended recipient computation-control unit of the synchronization token 830. For example, the synchronization token 830 can specify a client identifier (ID) for the intended recipient computation-control unit of the synchronization token 830. In the illustrated example, the synchronization token 830 can specify the second computation control unit 810*b*.

In some examples, the synchronization token 830 can further specify a bitmap of client IDs of consumer CCUs 810. The bitmap of client IDs can specify the consumer CCUs 810 that will consume the synchronization token 830.

In some examples, the synchronization token 830 can additionally specify a channel identifier (ID) of a channel that the synchronization token 830 is transmitted on between the first CCU 810*a* and the second CCU 810*b*. In short, the channel ID can provide context to the synchronization token 830 when transmitted from the first CCU 810*a* to the second CCU 810*b*. Specifically, if the MLA 804 can support multiple channels (as described further with reference to FIG. 9) between the CCUs 810 (e.g., logical channels), the channel ID can specify a particular channel (e.g., a particular channel of 32 logical channels). Furthermore, depending on the particular channel that is used to transmit the synchronization token 830, the context associated with the synchronization token 830 is based on the particular channel.

In some examples, the synchronization token 830 can indicate a Boolean counter to indicate whether the synchronization token 830 is the first token produced by the first CCU 810*a* for the particular completed first operation.

The second computation-control unit 810*b* can configure, according to the dependency instructions 820, dependency conditions for performing operations. Specifically, the second CCU 810*b* can generate a dependency matrix 840 based on the indicated dependencies of the dependency instructions 820. That is, the second CCU 810*b* can generate the dependency matrix 840 to indicate dependencies between operations performed at the (or by the) second CCU 810*b* and synchronization tokens (e.g., the synchronization token 830). That is, the dependency matrix 840 can indicate, for each operation performed at the second CCU 810*b*, synchronization tokens associated with the operation, as well as a count of synchronization tokens received for the operation. The dependency matrix 840 can include a plurality of counters—each counter corresponding to a particular synchronization token.

The second CCU 810*b* can receive the synchronization token 830 from the first CCU 810*a*. Specifically, the second CCU 810*b* can receive the synchronization token 830 from the first CCU 810*a* based on the receipt identifier of the synchronization token 830. That is, the synchronization token 830 can specify the second CCU 810*b* (e.g., client ID) such that the second CCU 810*b* can receive the synchronization token 830. The second CCU 810*b* can maintain a listing of synchronization tokens that the second CCU 810*b* can identify (e.g., "listen for"). That is, the second CCU 810*b* can actively search or detect for the synchronization tokens of the listing.

The second CCU 810*b* can update a dependency state to reflect the received synchronization token 830. Specifically, the second CCU 810*b* can increment a (unique) count of the dependency matrix 840 that corresponds to the synchronization token 830. That is, the second CCU 810*b* maintains the dependency matrix 840 to include separate and distinct counts for each synchronization token. When the synchronization token 830 is received by the second CCU 810*b*, the second CCU 810*b* increments the count that corresponds to the synchronization token 830.

The second CCU 810*b* can execute an operation in response to a determination that the dependency state satisfies the dependency condition. For example, the operation can include any operation associated with the ML accelerator 620 or 804. For example, the operation can include storing, accessing, or moving data associated with convolution operations mentioned herein, such as weights and activations.

Specifically, the second CCU 810*b* can compare the count of the dependency matrix 840 that corresponds to the synchronization token 830 to a threshold (dependency condition). When the count of the dependency matrix 840 that corresponds to the synchronization token 830 is the same as or greater than the threshold (dependency state satisfies the dependency condition), the second CCU 810*b* can execute the operation that corresponds to the synchronization token 830 (e.g., perform a particular machine-learning operation). The threshold can include any arbitrary, programmable threshold value depending on the application desired. For example, the threshold can be zero, or a non-zero value. For example, the particular operation performed at the CCU 810*b* (associated with the synchronization token 830) stalls until the counter associated with the synchronization token 830 has a non-zero value (e.g., a synchronization token is available).

When the second CCU 810*b* executes the operation, the second CCU 810*b* can "consume" the synchronization token 830. That is, when the second CCU 810*b* executes the operation, the second CCU 810*b* can decrement the corresponding count of the dependency matrix 840 that corresponds to the synchronization token 830.

In some examples, the second CCU 810*b* can, after execution of the second operation, generate an additional synchronization token 860 that represents the completion of the second operation. The synchronization token 860 can be associated with a token identifier (token ID) that identifies the synchronization token 860. Similar to that with respect to the synchronization token 830, the additional synchronization token 860 can specify an intended recipient computation-control unit of the additional synchronization token 860.

Figure 9:
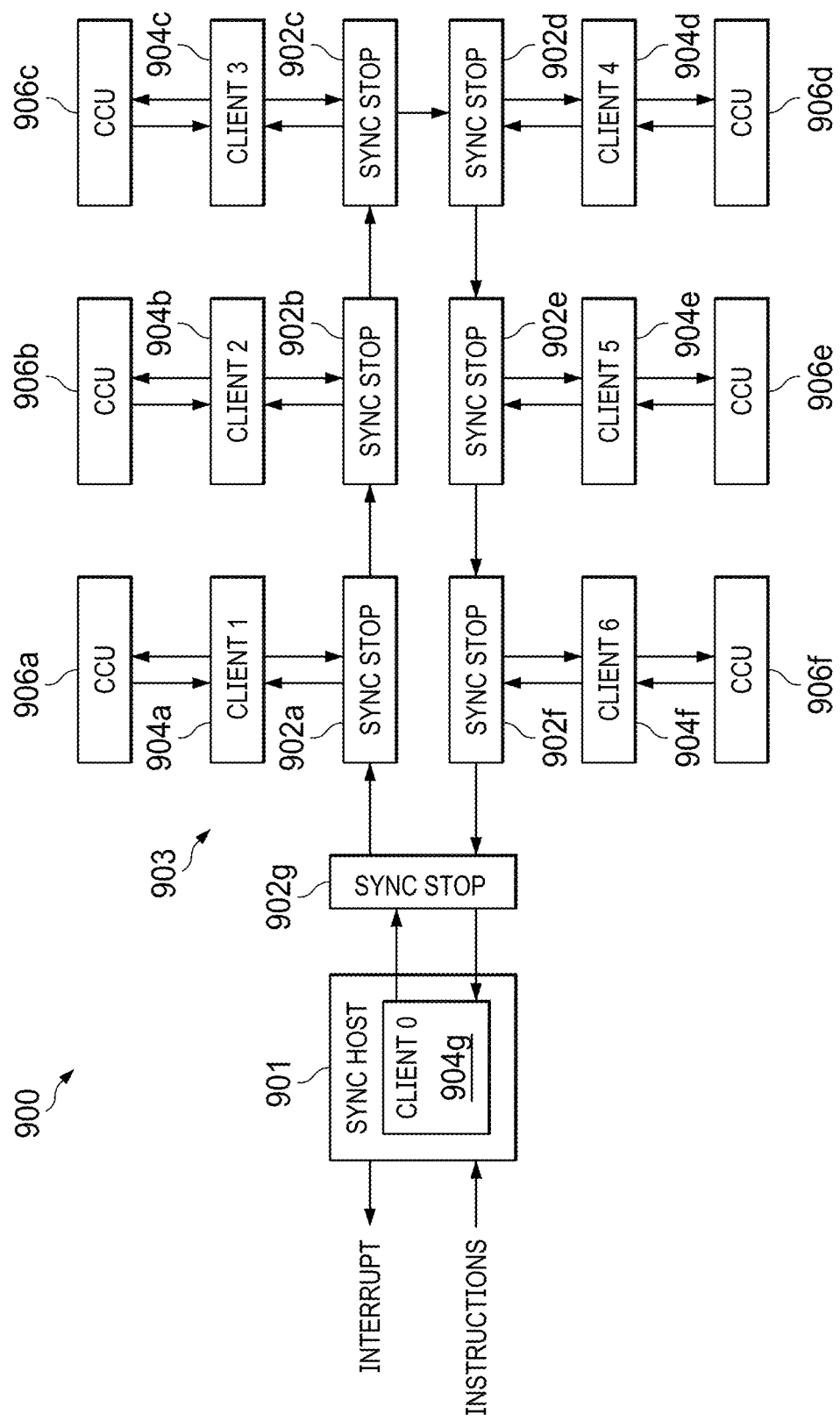

FIG. 9 illustrates a computing environment 900 that includes a synchronization bus 903 for synchronization between computation-control units. The environment 900 can include a synchronization host 901; synchronization stops 902*a*, 902*b*, 902*c*, 902*d*, 902*e*, 902*f*, 902*g* (collectively referred to as synchronization stops 902); synchronization clients 904*a*, 904*b*, 904*c*, 904*d*, 904*e*, 904*f*, 904*g* (collectively referred to as synchronization clients 904); and computation-control unit (CCU) 906*a*, 906*b*, 906*c*, 906*d*, 906*e*, 906*f* (collectively referred to as CCUs 906). The synchronization bus 903 can include any number of synchronization stops 902, synchronization clients 904, and CCUs 906 depending on the application desired. Each synchronization stop 902*a*, 902*b*, 902*c*, 902*d*, 902*e*, 902*f* can be associated with a respective synchronization client 904*a*, 904*b*, 904*c*, 904*d*, 904*e*, 904*f*; and each CCU 906*a*, 906*b*, 906*c*, 906*d*, 906*e*, 906*f* can be associated with a respective synchronization client 904*a*, 904*b*, 904*c*, 904*d*, 904*e*, 904*f*. The synchronization stops 902 can be communicatively coupled to each other via the synchronization bus 903.

In short, the synchronization bus 903 is a protocol transfer synchronization messages between the synchronization clients 904. The synchronization clients 904 can include multiple token queues for producer-consumer communication. The synchronization host 901 is a synchronization module for communicating with a host, such as the compiler 802. The synchronization stops 902 routes synchronization tokens for the synchronization clients 904.

The synchronization bus 903 can facilitate transmission of synchronization tokens (e.g., a ring synchronization token bus). At a high level, the synchronization stops 902 can receive synchronization tokens and determine whether each synchronization token is intended for its associated synchronization client 904 (e.g., based on the client ID). If the synchronization stop 902 determines that the synchronization token is for its associated synchronization client 904, the synchronization stop 902 can create a copy of the synchronization token and transmit the copy to the synchronization client 904. The synchronization client 904 can identify the channel ID and the token ID associated with the synchronization token to notify the associated CCU 906. The CCU 906 can increment the count of its corresponding dependency matrix (e.g., the dependency matrix 840) that is associated with the synchronization token. The synchronization bus 903 can continue transmitting the original synchronization token between the synchronization clients 904.

The synchronization host 901 can include the synchronization client 904g. The synchronization host 901 can facilitate interaction between a host processor and the synchronization bus 903. In short, the synchronization host 901 can expose memory-mapped registers to accord with (standard) microprocessor memory interfaces while concurrently interfacing to the synchronization bus 903 for token production and consumption.

To that end, one or more of the CCUs 906 can generate respective synchronization tokens (e.g., synchronization token 830). Each synchronization token can specify an intended CCU 906 (client CCU) via a client identifier (clientID) and a particular (logical) channel via a channel identifier (channelID). The CCUs 906 can broadcast the respective synchronization tokens via the synchronization bus 903.

For example, the CCU 906b (producer CCU) can generate a synchronization token that specifies the CCU 906d (consumer CCU) and a particular (logical) channel of the synchronization bus 903. In some examples, the combination of the clientID and the channelID can indicate a particular action that is relative to the intended CCU 906. The CCU 906b can communicate the synchronization token via the synchronization bus 903.

Each of the synchronization stops 902 can evaluate the synchronization tokens and determine if the clientID of the synchronization token is intended for the associated respective CCU 906. Specifically, each synchronization stop 902 can compare the clientID of the associated CCU 906 with the bitmap of clientIDs of the synchronization token. If the clientID of the associated CCU 906 matches a clientID of the bitmap, the synchronization stop 902 can pass the synchronization token to the associated CCU 906. That is, the synchronization stop 902 will transmit the tokenID of the synchronization token to the associated CCU 906. If the clientID of the associated CCU 906 does not match the clientID of the bitmap of the synchronization token, the synchronization stop 902 ignores the synchronization token. Continuing the example, the synchronization stop 902d can compare the clientID of the CCU 906d with the bitmap of clientIDs of the synchronization token, and determines that the client ID of the CCU 906d matches a clientID of the synchronization token, and passes the synchronization token to the synchronization client 904d.

In some examples, when the synchronization stops 902 transmits the copy of the synchronization token to the synchronization client 904, the synchronization stop 902 transmits a type of the synchronization token, the tokenID, and an indicator if the synchronization token is new or previously existing.

The synchronization clients 904 that receives the synchronization token can process the synchronization token (tokenID). The synchronization client 904 can identify the channelID used to transmit the synchronization token (logical channel) and provide the synchronization token to the associated CCU 906. Continuing the example, the synchronization client 904d can receive the synchronization token, determine the channelID, and pass the synchronization token to the CCU 906d.

In some examples, the synchronization client 904 can translate a global channelID associated with the synchronization token to a local channelID for the associated CCU 906. That is, the synchronization clients 904 can store respective mapping tables between global channelIDs (e.g., one of 32 channels) to local channelIDs (e.g., one of 5 channels) that are specific for each CCU 906. In other words, the CCU 906 may be "restricted" to a limited number of channels (e.g., 5 channels). Restriction in this way facilitates compactness of expression of CCU 906's dependencies and offers both storage and comparison logic savings.

The CCU 906 can receive the synchronization token and update the token dependency matrix based on the tokenID of the synchronization token. Continuing the example, the CCU 906d can receive the synchronization token and update the corresponding dependency matrix (e.g., the dependency matrix 840) for the tokenID of the synchronization token. The CCU 906d can update the corresponding dependency matrix by increasing the counter associated with the tokenID of the dependency matrix.

The CCU 906 can determine whether the dependencies associated with a particular operation are satisfied, and performs the operation when the dependencies are satisfied. In some examples, a particular operation (e.g., a convolution operation) can be associated with one or more of the counts (counters) of the dependency matrix. That is, the particular operation is associated with one or more synchronization tokens. When the count of the counters for the synchronization tokens associated with the particular operation are each greater than a respective threshold, the CCU 906 can perform the particular operation. For example, the CCU 906d can determine that the dependencies associated with a particular operation (e.g., movement of weight-based data from global to local memory) are satisfied and performs the particular operation. That is, the CCU 906d determines that the counts associated with synchronization tokens associated with the particular operation are satisfied (e.g., greater than respective thresholds), and performs the particular operation.

The CCU 906 can then generate a further synchronization token in response to performing the particular operation. The further synchronization token can specify an intended CCU 906 (client CCU) via a client identifier (clientID) and a particular (logical) channel via a channel identifier (channelID). The CCU 906 can broadcast the respective synchronization tokens via the synchronization bus 903. For example, the CCU 906d can generate the further synchronization token that specifies the CCU 906c and a particular (logical) channel of the synchronization bus 903. The CCU 906d can communicate the synchronization token via the synchronization bus 903.

In some examples, the CCU 906 transmits the respective synchronization tokens upon performing an associated operation at the CCU 906. That is, there is no delay between performing the operation and transmitting the associated synchronization token by the CCU 906. As a result, latency of the environment 900 is improved.

In some examples, the CCUs 906 (or CCUs 820) can operate asynchronously without a deterministic timing relationship with one another, and execute operations according to their respective programmable dependency matrices (e.g., the dependency matrix 840)—that is, based on the current state of its respective programmable dependency matrix. In other words, each of the CCUs 906 can operate as asynchronous threads (e.g., consumer and/or producer threads).

Figure 10:
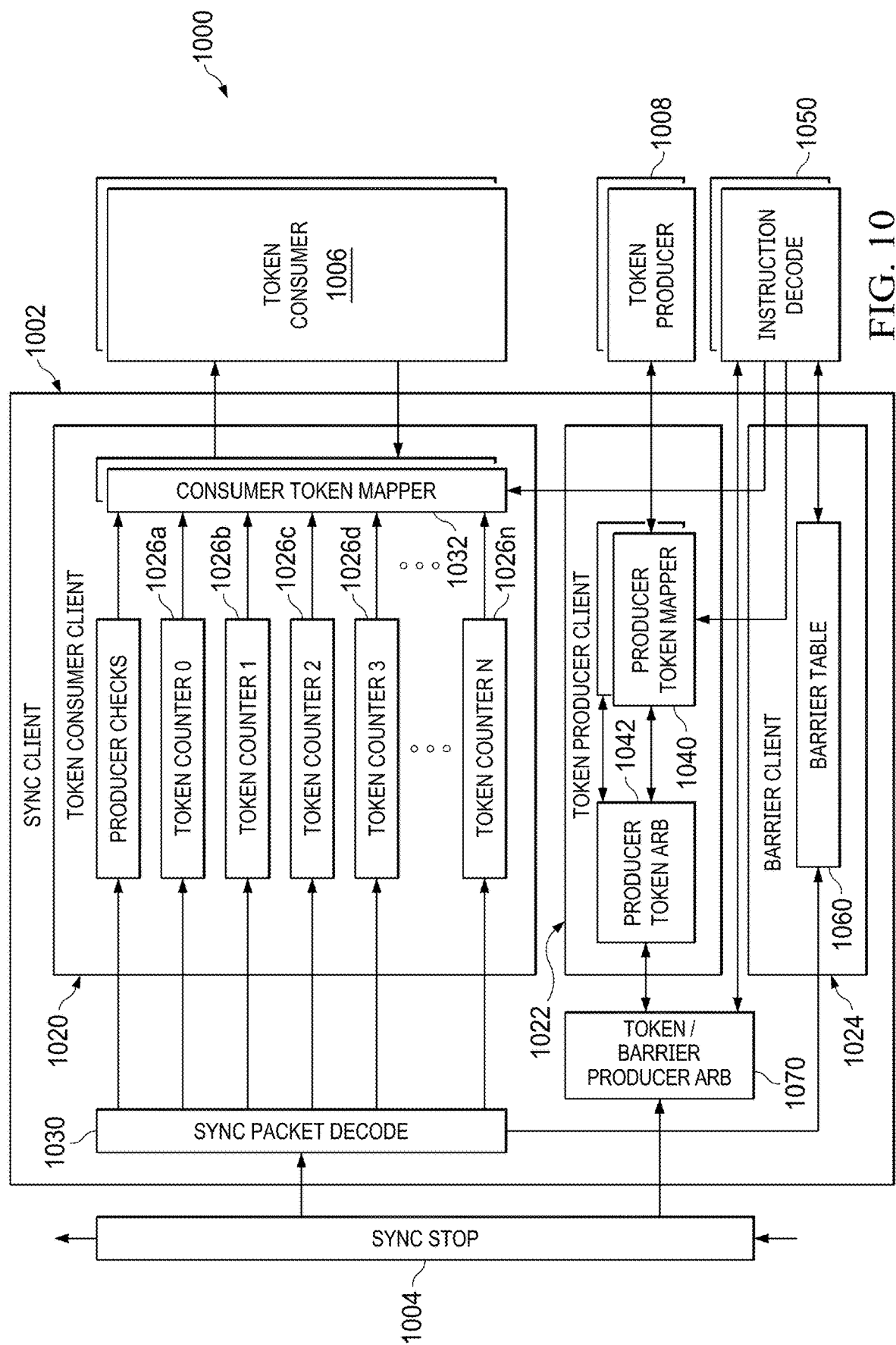

FIG. 10 illustrates a computing environment 1000 of a synchronization client 1002 (e.g., the synchronization client 904). The environment 1000 includes a synchronization stop 1004 (e.g., the synchronization stop 902), token consumers 1006 (e.g., CCU 810, 906), and token producers 1008 (e.g., CCU 810, 906). The synchronization client 1002 can include a token consumer client 1020, a token producer client 1022, and a barrier client 1024. The token consumer client 1020 can include token counters 1026*a*, 1026*b*, . . . , 1026*n* (collectively referred to as token counters 1026).

Initially, the synchronization stop 1004, if appropriate, transmits a copy of the synchronization token to the synchronization client 1002, and specifically, the synchronization packet decoder module 1030. The synchronization packet decoder module 1030 can strip off the payload of the synchronization token, and transmit such to the appropriate token counters 1026 that are targeted by the synchronization token (e.g. correspond to the synchronization token). The appropriate counter 1026 (or counters 1026) can increment a corresponding count based on the synchronization token. A consumer token mapper 1032 can then map the global token channel (e.g., one of 32 logical channels) to a local token channel (e.g., one of 5 logical channels) and provide a signal to the token consumer 1006 that the synchronization token is available for consumption by the token consumer 1006. The token consumer 1006 can consume the synchronization token (e.g., as mentioned above with respect to the CCU 810, 906) and provide a signal to the consumer token mapper 1032 to decrement the counter 1026 associated with the synchronization token indicating that the synchronization token has been "consumed."

In some cases, the token producer 1008 can generate a synchronization token. The token producer 1008 can transmit the synchronization token to the token producer client 1022, and specifically, a producer token mapper 1040 of the token producer client 1022. The producer token mapper 1040 can map a local token channel (e.g., one of 5 logical channels) to a global token channel (e.g., one of 32 logical channels) and provide the synchronization token to a producer token arbitrator module 1042 of the token producer client 1022. The producer token arbitrator module 1042 can determine a particular synchronization token to transmit if multiple synchronization tokens are produced at substantially the same time.

An instruction decode module 1050 can generate the consumer token mappings and the producer token mappings and provide the same to the token consumer client 1020 and the token producer client 1022, respectively.

The instruction decode module 1050 can further resolve any barrier dependency with the synchronization client 1002. Specifically, barriers are special instructions that can be inserted within any operation (thread) to explicitly signal other operations (threads) to wait for a signal. The barrier instruction can include a barrier wait instruction signal—stalls a thread, and can contain a timeout value to raise a hardware error. The barrier instructions can include a barrier release instruction signal to broadcast a message to other threads that are waiting on the barrier. The instruction decode module 1050 can provide a barrier signal to a barrier table 1060 (e.g. counter) of the barrier client 1024 to indicate a status of barriers that are tracked by the barrier table 1060. The token/barrier producer arbitration module 1070 can determine either a particular synchronization token or barrier to transmit if both are received at a same time to the synchronization stop 1004.

Figure 11:
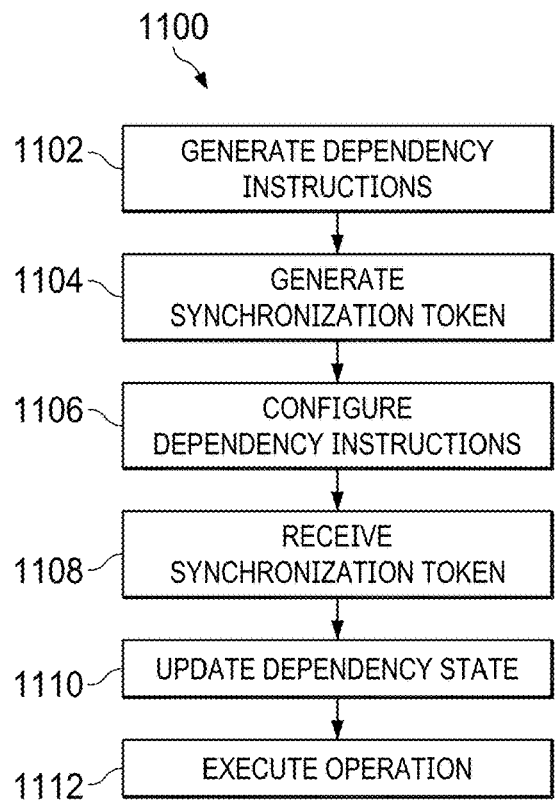
FIG. 11 illustrates an example method for a synchronization scheme for use with a machine-learning (ML) accelerator (MLA) used in a machine learning (ML) process.

FIG. 11 illustrates an example method 1100 for a synchronization scheme for use with a machine-learning (ML) accelerator (MLA) used in a machine learning (ML) process, implemented by the computing environments 800, 900, 1000 with respect to FIGS. 1-10. The method 1100 may begin at step 1102, where the compiler computing module 802 generates, based on a machine-learning model, the dependency instructions 820 indicating dependencies between computation-control units 810 of the MLA 804. At step 1104, the first computation-control unit 810*a* generates, after completion of a first operation, the synchronization token 830 representing the completion of the first operation. The synchronization token 830 specifies a recipient identifier for an intended recipient computation-control unit 810 of the synchronization token 830. At 1106, the second computation-control unit 810*b* configures, based on the dependency instructions 820, dependency conditions for performing operations. For example, the second computation-control unit 810*b* configures the dependency matrix 840. At 1108, the second computation-control unit 810*b* receives the synchronization token 830 based on the receipt identifier. At 1110, the second computation-control unit 810*b* updates a dependency state to reflect the received synchronization token 830. For example, the second computation-control unit 810*b* updates the dependency matrix 840 by incrementing a count associated with the synchronization token 830. At 1112, the second computation-control unit 810*b* executes an operation in response to the determination that the dependency state satisfies the dependency condition. For example, the second computation-control unit 810*b* executes a convolution operation in response to the count associated with the synchronization token is greater than a threshold (e.g., greater than 0).

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for inference of and/or training of a neural network machine learning model across different computing systems having different computer architectures/characteristics including the particular steps of the method of FIG. 11, this disclosure contemplates any suitable method for training a neural network machine learning model across different computing systems having different computer architectures/characteristics including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
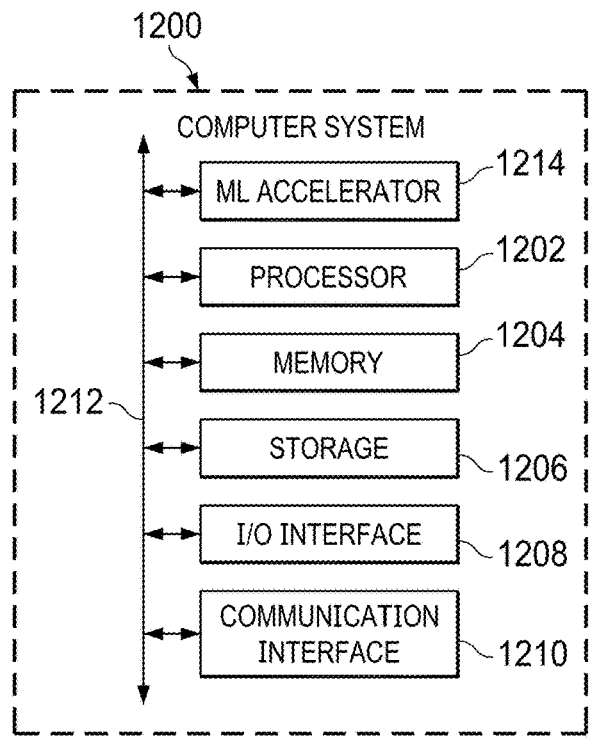
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an AR/VR reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, a bus 1212, and an ML accelerator 1214. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, ML accelerator 1214 may be similar to ML accelerator 620 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1214, as described herein. In particular embodiments, ML accelerator 1214 may be implemented using hardware and/or software elements in any suitable combination. As described herein, ML accelerator 1214 may include multiple tensor processor clusters and underlying tensor processors, each of which may include local memory for storing input features, weights for 2D kernels of various multi-dimensional filters, and/or output features of various convolution operations (not shown in FIG. 12). In particular embodiments, these local memories may be loaded from storage 1206, memory 1204, or from another source (such as, for example, another computer system 1200). The use of ML accelerator 1214 to execute the tensor instructions may improve the overall performance and resource utilization of computer system 1200 for those applications when compared to executing them using processor 1202 or using an existing ML accelerator.

In particular embodiments, memory 1204 includes main memory for storing instructions for processor 1202 to execute or data for processor 1202 to operate on. As an example, and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example, and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example, and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example, and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   a machine-learning accelerator (MLA) hardware comprising computation-control units that each have a programmable dependency matrix; and
   a compiler computing module configured to generate, based on a machine-learning model, dependency instructions indicating dependencies between the computation-control units;
   wherein the computation-control units include at least:
      a first computation-control unit configured to generate, after completion of a first operation, a synchronization token representing the completion of the first operation, the synchronization token specifying a recipient identifier for an intended recipient computation-control unit of the synchronization token;
      a second computation-control unit configured to:
         configure the programmable dependency matrix of the second computation-control unit according to the dependency instructions to include dependency conditions for performing operations;
         receive the synchronization token based on the recipient identifier;
         update a dependency state to reflect the received synchronization token; and
         execute an operation in response to a determination that the dependency state satisfies an associated dependency condition.

2. The system of claim 1, wherein the first computation-control unit and the second computation-control unit each generates the respective programmable dependency matrix based on the dependencies between the computation-control units.

3. The system of claim 2, wherein the second computation-control unit updates the dependency state by incrementing a count of the respective programmable dependency matrix that corresponds to the received synchronization token.

4. The system of claim 3, wherein the second computation-control unit executes the operation based on the count.

5. The system of claim 1, wherein the synchronization token specifies a recipient identifier for an intended recipient based on a channel identifier (ID) of a channel that the synchronization token is transmitted on between the first computation-control unit and the second computation-control unit.

6. The system of claim 1, wherein the synchronization token specifies a receipt identifier for an intended receipt based on a client identifier (ID) of the second computation-control unit.

7. The system of claim 1, wherein the second computation-control unit, after execution of the operation, generates an additional synchronization token representing the completion of the operation, the additional synchronization token specifying a recipient identifier for an intended recipient computation-control unit of the additional synchronization token.

8. The system of claim 1, wherein the computation-control units:
   operate asynchronously without a deterministic timing relationship with one another; and
   execute operations according to each unit's respective programmable dependency matrix.

9. A method, comprising:
   generating, by a compiler computing module, dependency instructions, based on a machine-learning model, indicating dependencies between computation-control units;
   generating, by a first computation-control unit of a machine-learning accelerator (MLA), after completion of a first operation, a synchronization token representing the completion of the first operation, the synchronization token specifying a recipient identifier for an intended recipient computation-control unit of the synchronization token;
   configuring, by a second computation-control unit of the MLA, according to the dependency instructions, dependency conditions for performing operations;
   receiving, by the second computation-control unit, the synchronization token based on the recipient identifier;
   updating, by the second computation-control unit, a dependency state to reflect the received synchronization token; and
   executing, by the second computation-control unit, an operation in response to a determination that the dependency state satisfies an associated dependency condition.

10. The method of claim 9, wherein the first computation-control unit and the second computation-control unit each generates the respective programmable dependency matrix based on the dependencies between the computation-control units.

11. The method of claim 10, wherein the second computation-control unit updates the dependency state by incrementing a count of the respective programmable dependency matrix that corresponds to the received synchronization token.

12. The method of claim 11, wherein the second computation-control unit executes the operation based on the count.

13. The method of claim 10, wherein the synchronization token specifies a recipient identifier for an intended recipient based on a channel identifier (ID) of a channel that the synchronization token is transmitted on between the first computation-control unit and the second computation-control unit.

14. The method of claim 10, wherein the synchronization token specifies a receipt identifier for an intended receipt based on a client identifier (ID) of the second computation-control unit.

15. The method of claim 10, wherein the second computation-control unit, after execution of the operation, generates an additional synchronization token representing the completion of the operation, the additional synchronization token specifying a recipient identifier for an intended recipient computation-control unit of the additional synchronization token.

16. One or more computer-readable non-transitory storage media embodying software that is operable when executed to:
generating, by a compiler computing module, dependency instructions, based on a machine-learning model, indicating dependencies between the computation-control units;
generating, by a first computation-control unit of a machine-learning accelerator (MLA), after completion of a first operation, a synchronization token representing the completion of the first operation, the synchronization token specifying a recipient identifier for an intended recipient computation-control unit of the synchronization token;
configuring, by a second computation-control unit of the MLA, according to the dependency instructions, dependency conditions for performing operations;
receiving, by the second computation-control unit, the synchronization token based on the recipient identifier;
updating, by the second computation-control unit, a dependency state to reflect the received synchronization token; and
executing, by the second computation-control unit, an operation in response to a determination that the dependency state satisfies an associated dependency condition.

17. The computer-readable non-transitory storage media of claim 16, wherein the first computation-control unit and the second computation-control unit each generates the respective programmable dependency matrix based on the dependencies between the computation-control units.

18. The computer-readable non-transitory storage media of claim 17, wherein the second computation-control unit updates the dependency state by incrementing a count of the respective programmable dependency matrix that corresponds to the received synchronization token.

19. The computer-readable non-transitory storage media of claim 18, wherein the second computation-control unit executes the operation based on the count.

20. The computer-readable non-transitory storage media of claim 16, wherein the synchronization token specifies a recipient identifier for an intended recipient based on a channel identifier (ID) of a channel that the synchronization token is transmitted on between the first computation-control unit and the second computation-control unit.

* * * * *